United States Patent
Shi (10) Patent No.: US 12,108,458 B2
(45) Date of Patent: Oct. 1, 2024

(54) METHOD OF RANDOM ACCESS, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 359 days.

(21) Appl. No.: 17/558,471

(22) Filed: Dec. 21, 2021

(65) Prior Publication Data
US 2022/0117001 A1    Apr. 14, 2022

Related U.S. Application Data (63) Continuation of application No. PCT/CN2019/105575, filed on Sep. 12, 2019.

(51) Int. Cl.
H04W 74/0833    (2024.01)

(52) U.S. Cl.
CPC .............. H04W 74/0833 (2013.01)

(58) Field of Classification Search
CPC ........... H04W 56/001; H04W 72/0446; H04W 74/006; H04W 74/0808; H04W 74/0833; H04W 74/0836; H04W 74/008; H04W 76/18; H04W 76/19; H04W 80/02
USPC ........................................................ 370/329
See application file for complete search history.

(56) References Cited

U.S. PATENT DOCUMENTS

| | | | |
|---|---|---|---|
| 11,272,548 B2 * | 3/2022 | Agiwal | H04L 1/1848 |
| 2008/0207196 A1 * | 8/2008 | Pettersson | H04W 24/00 455/434 |
| 2010/0202288 A1 * | 8/2010 | Park | H04W 74/008 370/230 |

(Continued)

FOREIGN PATENT DOCUMENTS

| | | |
|---|---|---|
| CN | 102984806 | 3/2013 |
| CN | 105848183 | 8/2016 |
| CN | 109151902 | 1/2019 |

OTHER PUBLICATIONS

OPPO, "Fall back mechanisms for 2-steps RACH," 3GPP TSG-RAN WG2 Meeting #106, R2-1905599, May 2019.

(Continued)

*Primary Examiner* — Jean A Gelin
(74) *Attorney, Agent, or Firm* — Hodgson Russ LLP (57) ABSTRACT

A method of random access, a terminal device, and a non-transitory computer-storage medium are provided. The method includes the following. In response to a terminal device failing to achieve access when a value of a counter for recording a number of transmissions of a random access message containing a preamble reaches N during a first random access procedure, the terminal device switches from the first random access procedure to a second random access procedure, where the counter is further configured to count a number of transmissions of a random access message containing a preamble during the second random access procedure, and N is a positive integer.

12 Claims, 5 Drawing Sheets

(56) References Cited

U.S. PATENT DOCUMENTS

| | | | |
|---|---|---|---|
| 2013/0250888 A1* | 9/2013 | Lu ..................... | H04W 72/0453 |
| | | | 370/329 |
| 2016/0309507 A1* | 10/2016 | Park ....................... | H04W 4/70 |
| 2018/0103465 A1* | 4/2018 | Agiwal ............... | H04W 74/004 |
| 2018/0323908 A1* | 11/2018 | Chou ................... | H04L 1/1671 |
| 2018/0359784 A1* | 12/2018 | Agiwal ................ | H04L 5/0007 |
| 2019/0053272 A1* | 2/2019 | Tsai ...................... | H04W 72/23 |
| 2019/0075598 A1* | 3/2019 | Li ..................... | H04W 74/0833 |
| 2019/0104553 A1 | 4/2019 | Johansson et al. | |
| 2019/0208436 A1* | 7/2019 | Zhou ..................... | H04B 7/088 |
| 2020/0187263 A1* | 6/2020 | Shreevastav ...... | H04W 74/0833 |
| 2020/0212987 A1* | 7/2020 | Priyanto ........... | H04W 74/0833 |
| 2020/0229241 A1* | 7/2020 | Jeon ................. | H04W 74/0833 |
| 2020/0252973 A1* | 8/2020 | Zhang ............... | H04W 74/0841 |
| 2020/0260485 A1* | 8/2020 | Lei ........................ | H04W 24/08 |
| 2020/0275492 A1* | 8/2020 | Lei ........................ | H04L 5/0053 |
| 2020/0288506 A1* | 9/2020 | Lei .................... | H04W 74/0833 |
| 2021/0051672 A1* | 2/2021 | Rastegardoost .... | H04W 74/006 |
| 2021/0120504 A1* | 4/2021 | Ohara ............... | H04W 74/0833 |
| 2021/0219348 A1* | 7/2021 | Zhang ............... | H04W 72/0446 |
| 2021/0227594 A1* | 7/2021 | Lee ................... | H04W 74/0833 |
| 2021/0282191 A1* | 9/2021 | Chang ................. | H04W 16/18 |
| 2021/0360706 A1* | 11/2021 | Cirik .................. | H04W 74/0816 |
| 2022/0053575 A1* | 2/2022 | He ........................ | H04W 72/23 |
| 2022/0124828 A1* | 4/2022 | Uchino ............. | H04W 74/0833 |
| 2022/0264638 A1* | 8/2022 | Qiu ................... | H04W 72/0446 |
| 2022/0272768 A1* | 8/2022 | Liu ................... | H04W 72/0446 |
| 2022/0287139 A1* | 9/2022 | Harris .................. | H04W 76/27 |
| 2022/0312501 A1* | 9/2022 | Lei ........................ | H04L 1/1867 |

OTHER PUBLICATIONS

WIPO, International Search Report for PCT/CN2019/105575, May 28, 2020.
Session Chair (Interdigital), "Report from session on Legacy LTE, Rel-15 LTE, and NR NTN SI, NR power saving SI," 3GPP TSG-RAN WG2 Meeting #106, R2-1908105, May 2019.
NEC, "Details on fallback mechanisms," 3GPP TSG-RAN WG2 #107, R2-1909147 (revision of R2-1906755), Aug. 2019.
OPPO, "Fall back mechanisms for 2-steps Rach," 3GPP TSG-RAN WG2 Meeting #107, R2-1908771, Aug. 2019.
Zte et al., "Further discussions on 2-step RACH procedures," 3GPP TSG RAN WG1 Meeting #97, R1-1905990, May 2019.
Nokia et al., "On 2-step RACH Procedure," 3GPP TSG RAN WG1 #97, R1-1906747, May 2019.
Panasonic, "Discussion on 2-step RACH procedure," 3GPP TSG RAN WG1 #98, R1-1908793, Aug. 2019.
Huawei et al., "2-step RACH and preamble transmission counters," 3GPP TSG-RAN WG2 # 107, R2-1910682, Aug. 2019.
EPO, Extended European Search Report for EP Application No. 19945203.8, May 11, 2022.
Sony, "Discussion on Procedure for 2-step Rach", 3GPP TSG RAN WG1 #98, R1-1908763, Aug. 2019.
EPO, Communication for EP Application No. 19945203.8, Feb. 24, 2023.
CNIPA, First Office Action for CN Application No. 202210428229.X, Jun. 30, 2023.

\* cited by examiner

METHOD OF RANDOM ACCESS, TERMINAL DEVICE, AND NON-TRANSITORY COMPUTER-READABLE STORAGE MEDIUM

CROSS-REFERENCE TO RELATED APPLICATION(S)

This application is a continuation of International Application No. PCT/CN2019/105575, filed on Sep. 12, 2019, the entire disclosure of which is incorporated herein by reference.

TECHNICAL FIELD

This disclosure relates to the communication field, and in particular, to a method of random access, a terminal device, and a non-transitory storage medium.

BACKGROUND

Random access is a process in which a terminal device attempts to access a communication network. A method of random access includes the following four steps: the terminal device transmits a preamble to a network device, receives a random access response (RAR) message from the network device, transmits message 3 (msg3) to the network device, and receives msg4 from the network device. The method of random access can also be called a 4-steps method.

Another method of random access includes the following two steps: the terminal device transmits msgA to the network device, and receives msgB from the network device, where msgA contains a preamble and a payload, and msgB is used to resolve contention during random access. The method of random access can also be called a 2-steps method.

Compared with the 4-steps method, the 2-steps method reduces the delay of random access and signaling overhead. If random access still fails after several transmissions of msgA, the terminal device can fall back to the 4-steps method to continue random access. The above-mentioned fallback scheme improves the success rate of random access, but a relatively complex processing scheme is introduced. How to reduce the complexity of the fallback scheme is a problem that needs to be solved at current time.

SUMMARY

The present disclosure provides a method of random access, a terminal device, and a non-transitory computer-readable storage medium.

In a first aspect, a method of random access is provided. The method includes the following. In response to a terminal device failing to achieve access when a value of a counter for recording a number of transmissions of a random access message containing a preamble reaches N during a first random access procedure, the terminal device switches from the first random access procedure to a second random access procedure, where the counter is further configured to count a number of transmissions of a random access message containing a preamble during the second random access procedure, and N is a positive integer.

In a second aspect, a terminal device is provided. The terminal device includes a processor and a memory storing a computer program which, when executed by the processor, causes the processor to switch from a first random access procedure to a second random access procedure, in response to the terminal device failing to achieve access when a value of a counter for recording a number of transmissions of a random access message containing a preamble reaches N during the first random access procedure, where the counter is further configured to count a number of transmissions of a random access message containing a preamble during the second random access procedure, and N is a positive integer.

In a third aspect, a non-transitory computer-readable storage medium is provided. The storage medium stores a computer program which, when executed by a processor, causes the processor to switch from a first random access procedure to a second random access procedure, in response to a terminal device failing to achieve access when a value of a counter for recording a number of transmissions of a random access message containing a preamble reaches N during the first random access procedure, where the counter is further configured to count a number of transmissions of a random access message containing a preamble during the second random access procedure, and N is a positive integer.

DETAILED DESCRIPTION

The technical solutions in implementations of the present disclosure will be illustrated in the following with reference to accompanying drawings in the implementations of the present disclosure. Apparently, the described implementations are merely a part of rather than all the implementations. Based on the implementations of the present disclosure, all other implementations obtained by those of ordinary skill in the art without creative efforts are within the scope of protection of the present disclosure.

Figure 1:
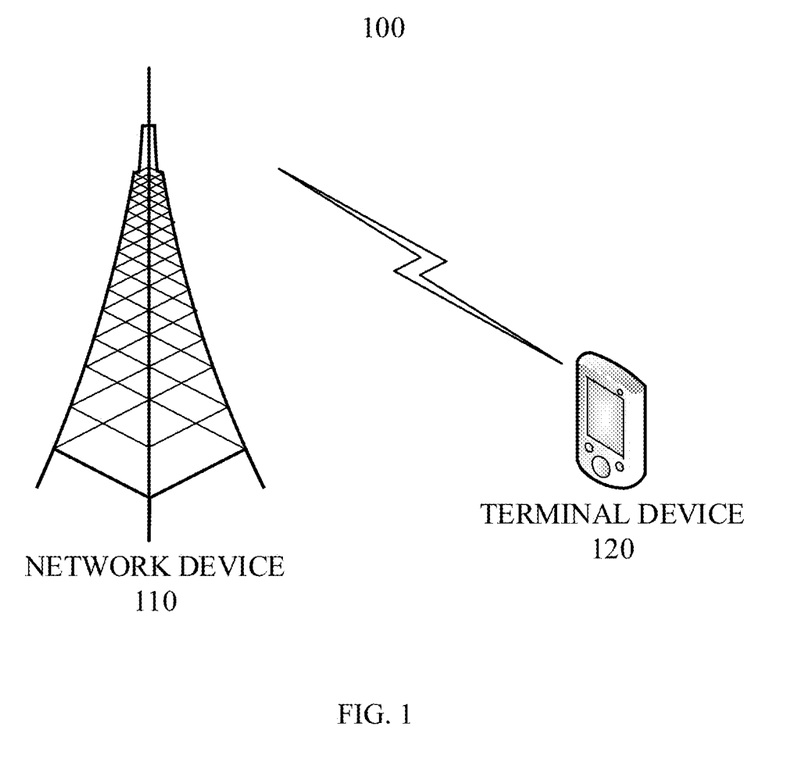
FIG. 1 is a schematic diagram illustrating a communication system applicable to the present disclosure.

An application scenario of the present disclosure is first illustrated. FIG. 1 is a schematic diagram illustrating a communication system applicable to the present disclosure.

A communication system 100 includes a network device 110 and a terminal device 120. The terminal device 120 communicates with the network device 110 via electromagnetic waves.

In the present disclosure, the terminal device 120 may include various devices with wireless communication functions such as handheld devices, vehicle-mounted devices, wearable devices, computing devices, or other processing devices connected to a wireless modem, for example, devices defined by 3rd generation partnership project (3GPP) such as user equipment (UE), mobile stations (MSs), soft terminals, home gateways, set-top boxes, etc.

The network device 110 may be a base station defined by 3GPP, for example, a generation NodeB (gNB) in a 5th generation (5G) communication system. The network device 110 may also be a non-3GPP access network device, such as an access gateway (AGF). The network device 110 may also be a relay station, an access point, a vehicle-mounted device, a wearable device, and other types of devices.

The communication system 100 is only an example, and a communication system applicable to the present disclosure is not limited to the communication system 100. For example, the communication system 100 may include other numbers of terminal devices and network devices. For the sake of brevity, the terminal device and the network device below are no longer accompanied by reference numerals.

After a cell search procedure, the terminal device has established a downlink (DL) synchronization with the network device (also referred to as a "cell"), so the terminal device can receive DL data. However, the terminal device needs to establish an uplink (UL) synchronization with the network device to facilitate UL transmission. The terminal device can establish a connection with the network device through a random access procedure to achieve UL synchronization. That is to say, through random access, the terminal device can achieve UL synchronization, and obtain a unique identifier (ID) assigned by the network device, i.e., a cell radio network temporary identifier (C-RNTI). Therefore, random access can be applied not only in initial access, but also in a case where user UL synchronization is lost.

A random access procedure can generally be triggered by one of the following 6 types of trigger events.

(1) Initial access

The terminal device can enter a radio resource control (RRC)_CONNECTED state from an RRC_IDLE state.

(2) Handover

When the terminal device needs to establish a UL synchronization with a new cell, the terminal device needs to initial random access in the new cell.

(3) RRC connection re-establishment

The terminal device re-establishes wireless connection in response to radio link failure (RLF).

(4) In the RRC_CONNECTED state, when DL data arrives, UL is in "non-synchronization" status.

At this point, when the DL data arrives, the terminal device needs to reply with an acknowledgement (ACK) or a negative acknowledgement (NACK).

(5) In the RRC_CONNECTED state, when UL data arrives, UL is in "non-synchronization" status or no available physical uplink control channel (PUCCH) resource can be used for scheduling request (SR) transmission.

When the UL data arrives, for example, when a measurement report needs to be reported or data needs to be transmitted, if the UL is in the "non-synchronization" status, the terminal device can initiate a random access procedure. If the terminal device in UL synchronization status is allowed to use a random access channel (RACH) to replace role of an SR, when the UL is in the "non-synchronization" status, the terminal device can initial the random access procedure.

(6) In the RRC_CONNECTED state, to locate, it is necessary to obtain timing advance (TA).

In addition, random access can be triggered due to RRC INACTIVE state transition, request for other system information (OSI), beam failure recovery, or the like.

Figure 2:
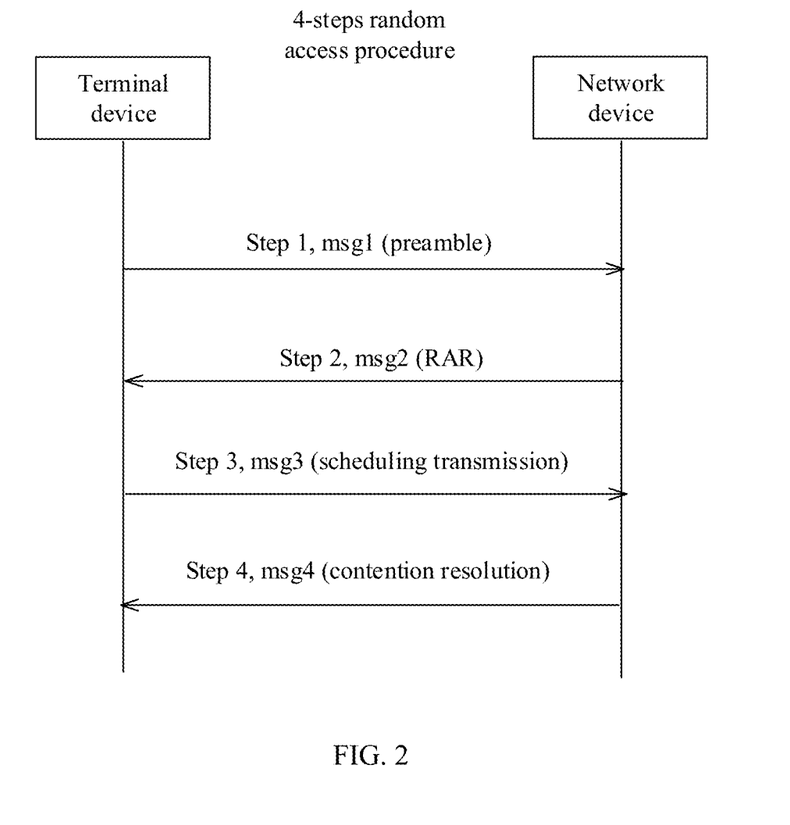
FIG. 2 is a schematic diagram illustrating a 4-steps random access method applicable to the present disclosure.

FIG. 2 is a schematic diagram illustrating 4-steps random access. The 4-steps random access procedure may include the following four steps.

Step 1, a terminal device transmits msg1.

The terminal device can transmit msg1 to a network device through a physical random access channel (PRACH) to inform the network device that the terminal device initiates a random access request. Msg1 carries a random access preamble (RAP), where the RAP can also be called a preamble, a random access preamble sequence, a preamble sequence, etc. The network device can estimate, according to msg1, the transmission delay between the network device and the terminal device and the size of UL resources required by msg3 in step 3.

Step 2, the network device transmits msg2.

After the network device receives msg1 transmitted by the terminal device, the network device transmits msg2, i.e., an RAR message, to the terminal device. The terminal device can monitor, in an RAR window, a physical downlink control channel (PDCCH) scrambled using a random access radio network temporary identifier (RA-RNTI) to receive a physical downlink shared channel (PDSCH) scheduled by the PDCCH, where the RAR message is carried in the PDSCH. The RAR message can be scheduled using a downlink control information (DCI) format 1-0.

If the terminal device does not receive, in the RAR window, the RAR message replied by the network device, it is determined that the random access fails. If the terminal device successfully detects the RAR message in the RAR window, and an index of a preamble carried in the RAR message is the same as that of a preamble in msg1, the terminal device can stop detecting the RAR message. The terminal device can use the RA-RNTI to descramble the RAR message, and the RA-RNTI is related to the PRACH used by the terminal device to transmit msg1.

The RAR message may include response messages for multiple terminal devices that transmit a preamble. The response message for each terminal device contains information used by the terminal device such as a RACH preamble identity (RAPID), resource allocation information of msg3, TA adjustment information, and a temporary cell radio network temporary identifier (TC-RNTI), etc.

In addition, a subheader of the RAR message may also contain a backoff index (BI) used to indicate backoff time of msg1 retransmission.

Step 3, the terminal device transmits msg3.

After the terminal device receives the RAR message, the terminal device determines whether the RAR message belongs to the terminal device. For example, the terminal device can use a preamble index to check. When the terminal device determines that the RAR message belongs to the terminal device, the terminal device generates msg3 at an RRC layer and transmits msge3 to the network device, where msg3 can carry an ID of the terminal device, etc.

For different trigger events of random access, msg3 transmitted by the terminal device in step 3 of the 4-steps random access procedure may contain different contents.

For example, for an initial access scenario, msg3 contains an RRC connection request message generated at the RRC layer, where msg3 can carry a non-access stratum (NAS) ID of the terminal device. In addition, msg3 can also carry, for example, a serving temporary mobile subscriber identity (S-TMSI) of the terminal device, a random number, or the like.

For another example, for an RRC connection re-establishment scenario, msg3 contains the RRC connection re-establishment message generated at the RRC layer and does not carry any NAS message. In addition, msg3 can also carry, for example, the C-RNTI, protocol control information (PCI), etc.

For another example, for a switch scenario, msg3 contains an RRC switch confirm message generated at the RRC layer, where msg3 carries the C-RNTI of the terminal device. In addition, msg3 can also carry information such as a buffer status report (BSR) and so on.

For other trigger events such as UL/DL data arrival scenarios, msg3 may contain the C-RNTI of the terminal device.

In some cases, UL transmission usually uses specific information of the terminal device. For example, the C-RNTI and the like are used to scramble data carried in an uplink shared channel (UL-SCH). But the conflict has not been resolved at this time, so scrambling msg3 cannot be based on the C-RNTI, and only the TC-RNTI can be used.

Step 4, the network device transmits msg4.

The network device transmits msg4 to the terminal device, and the terminal device receives msg4 to complete contention resolution. During an RRC connection establishment procedure, msg4 can carry an RRC connection establishment message.

If msg3 carries the unique ID of the terminal device, such as the C-RNTI or an ID from a core network (such as the S-TMSI or a random number), msg4 carries the unique ID of the terminal device to specify the terminal device that wins the competition. The PDCCH used for scheduling msg4 can be scrambled using the C-RNTI.

If msg3 does not carry the unique identifier of the terminal device, for example, in the initial access procedure, msg3 does not contain the C-RNTI, a manner in which the terminal device performs conflict resolution may be as follows. Receive the PDSCH in msg4 and determine whether a contention resolution ID in the PDSCH matches a common control channel (CCCH) service data unit (SDU) in msg3, where the PDCCH used for scheduling msg4 can be scrambled using the TC-RNTI.

A terminal device that does not win in the contention resolution will re-initiate random access.

In the 5G communication system, when the terminal device performs random access, in addition to the aforementioned 4-steps random access method, a 2-steps random access method can also be used. One possible manner is to regard msg1 and msg3 in the 4-steps random access procedure as a first message in the 2-steps random access procedure and transmit the first message, and regard msg2 and msg4 in the 4-steps random access procedure as a second message in the 2-steps random access procedure and transmit the second message.

Figure 3:
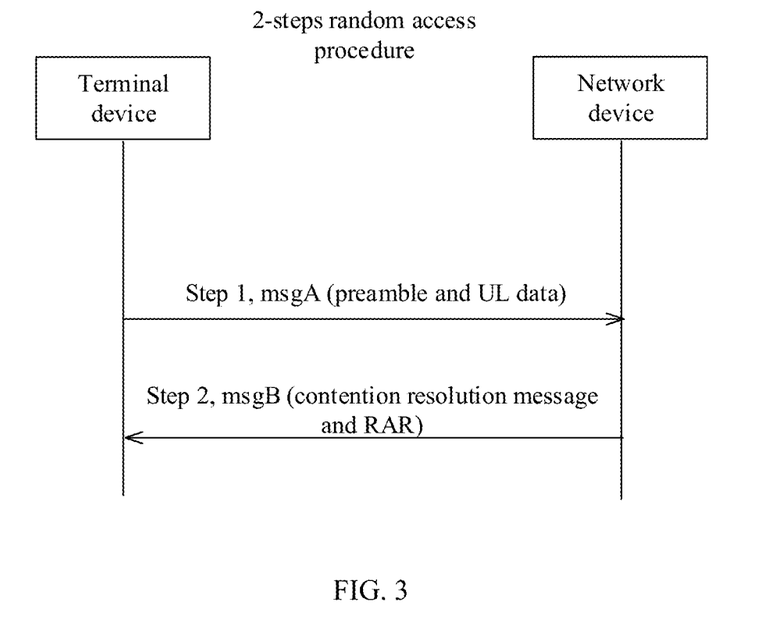
FIG. 3 is a schematic diagram illustrating a 2-steps random access method applicable to the present disclosure.

As illustrated in FIG. 3, a 2-steps random access procedure may include the following two steps.

Step 1, a terminal device transmits a first message (may be called msgA).

The first message may contain a preamble and UL data (or a payload). The UL data may be carried on a UL channel, and the UL channel may be, for example, a physical uplink shared channel (PUSCH). The PUSCH may carry, for example, an ID of the terminal device and a cause of an RRC request. The first message can carry part of or all information carried in msg1 and msg3 in the 4-steps random access procedure.

Step 2, a network device transmits a second message (may be called msgB).

If the network device successfully receives the first message transmitted by the terminal device, the network device transmits the second message to the terminal device. The second message may include, for example, conflict resolution information, C-RNTI allocation information, TA adjustment information, and so on. The second message may carry part of or all information carried in msg2 and msg4 in the 4-steps random access procedure.

In the 2-steps random access procedure, the second message carries information for a single terminal device such as conflict resolution information (including information related to the ID of the terminal device in the first message transmitted by the terminal device), the C-RNTI allocation information, the TA adjustment information, etc. In addition, the second message may also carry an RRC connection establishment message, etc.

Since the standardization scheme of the 2-steps random access procedure has not yet been finalized, FIG. 3 is merely used as an example for illustration. There are other possibilities for the definition of each random access message involved, and in the present disclosure the definition of each random access message in the 2-steps random access procedure is not limited. The method in the present disclosure is applicable to all other 2-steps random access procedures.

Figure 4:
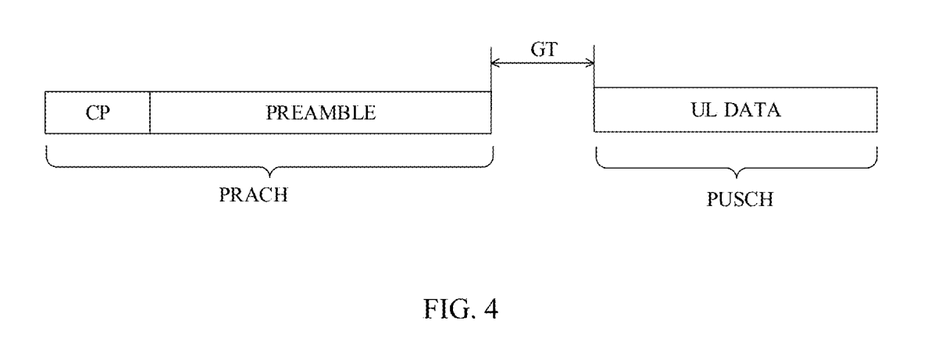
FIG. 4 is a schematic diagram illustrating a random access resource applicable to the present disclosure.
Figure 5:
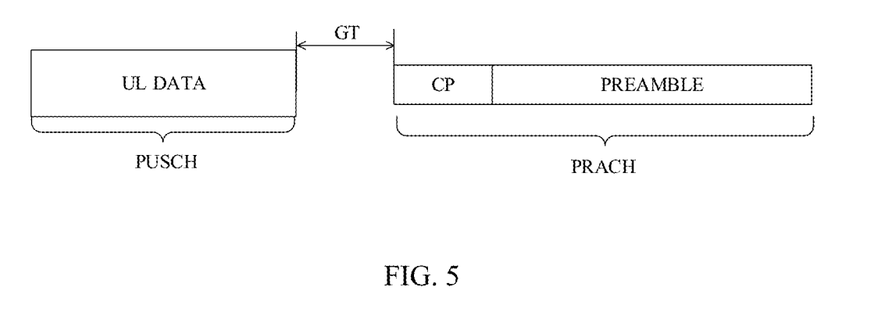
FIG. 5 is a schematic diagram illustrating another random access resource applicable to the present disclosure.

In the 2-steps random access procedure, transmission resources for the first message may include a PRACH used to transmit a preamble and a PUSCH used to transmit UL data. The PRACH can also be used to transmit a cyclic prefix (CP) for the preamble, and the CP is located before the preamble. A guard time (GT) can also be configured between the PRACH and the PUSCH. The PRACH can be located before the PUSCH, as illustrated in FIG. 4. The PRACH can also be located after the PUSCH, as illustrated in FIG. 5.

In order to improve the success rate of random access, the 5G communication system introduces a fallback scheme from the 2-steps random access procedure to the 4-steps random access procedure.

If a random access procedure still fails after the terminal device transmits msgA N times, the terminal device can fall back to the 4-steps RACH procedure (the random access procedure illustrated in FIG. 2), that is, the terminal device only uses a PRACH to transmit a preamble. The network device can configure a value of N.

The above-mentioned fallback scheme improves the success rate of random access, but a relatively complicated processing scheme is introduced. For example, the terminal device needs to count the number of transmissions of msgA and the number of transmission of msg1, respectively, so as to avoid a problem that the number of transmissions of msgA exceeds the maximum number of transmission of msgA and the number of transmissions of msg1 exceeds the maximum number of transmissions of msg1.

The present disclosure provides a method of random access, which can reduce the complexity of the fallback scheme.

Figure 6:
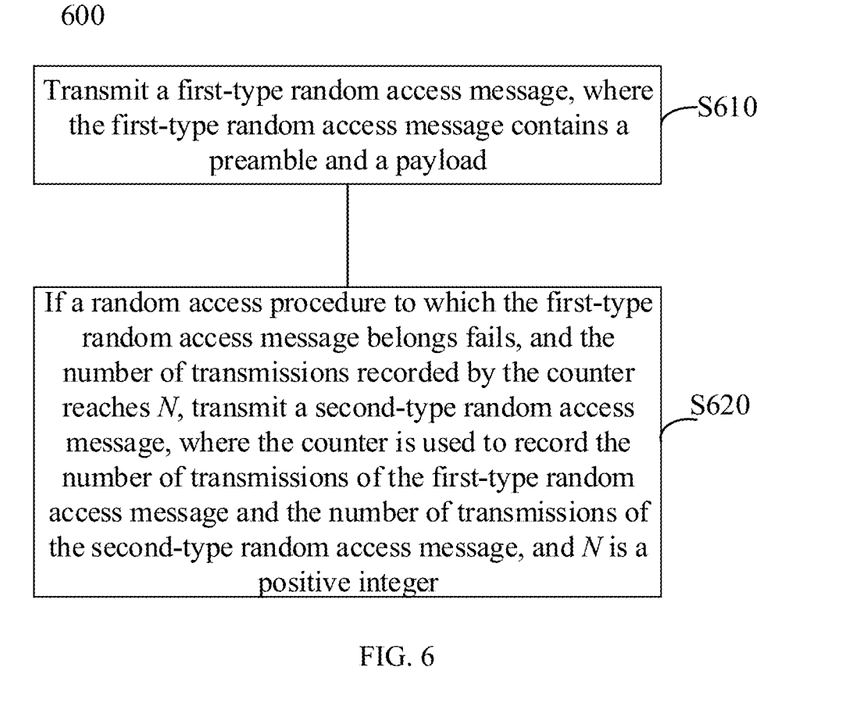
FIG. 6 is a schematic diagram illustrating a method of random access provided in the present disclosure.

As illustrated in FIG. 6, a method 600 includes the following.

At S610, transmit a first-type random access message, where the first-type random access message contains a preamble and a payload.

The method 600 can be executed by a terminal device or a chip in the terminal device. The first-type random access message is, for example, msgA described above, and the payload may be carried in a PUSCH, for example, an ID of the terminal device.

When a medium access control (MAC) layer or an RRC layer triggers a random access procedure, the terminal device selects a 2-steps RACH according to a specific rule. The specific rule is, for example, a reference signal received power (RSRP) threshold criteria broadcast by the network device.

In the present disclosure, "when event A occurs" is used to describe the objective fact that event A occurs, and cannot be understood to limit the moment when event A occurs.

The terminal device maintains a counter. The counter is used to record the number of retransmissions of msgA and the number of retransmissions of msg1. The counter may be a variation of a reused PREAMBLE_TRANSMISSION-_COUNTER or other counters.

An initial value of the above counter may be 0 or 1. In the following, the initial value of the counter is 1 for illustration.

Each time the terminal device transmits msgA, the value of the counter is incremented by 1. For example, after the terminal device transmits msgA once, the value of the counter is 2, and after the terminal device transmits msgA N times, the value of the counter is N+1.

After the terminal device transmits msgA, monitor msgB. MsgB contains a fallback RAR (fallbackRAR), a success RAR (successRAR), and BI.

At S620, if a random access procedure to which the first-type random access message belongs fails, and the number of transmissions recorded by the counter reaches N, transmit a second-type random access message, where the counter is used to record the number of transmissions of the first-type random access message and the number of transmissions of the second-type random access message, and N is a positive integer.

The random access procedure to which the first-type random access message belongs is, for example, the 2-steps random access procedure. When one of the following cases occurs, the terminal device can determine that the 2-steps random access procedure fails.

The terminal device does not receive a response message from any network device in a monitor window of msgB.

The terminal device receives msgB in the monitor window of msgB, but msgB does not contain the fallbackRAR or the successRAR.

After receiving msgB containing the fallbackRAR in the monitor window of msgB, the terminal device transmits msg3; subsequently, a correct contention resolution message is not received before a contention resolution timer expires.

The above three cases are only three examples of failure of the random access procedure, and the terminal device can determine that the random access procedure to which the first-type random access message belongs fails according to other cases.

After the terminal device determines that the 2-steps random access procedure fails, if the number of transmissions recorded by the counter does not reach N, the terminal device can retransmit msgA, and if the number of transmissions recorded by the counter reaches N, the terminal device can fall back to the 4-steps random access procedure, that is, transmit msg1 (an example of the second-type random access message).

After the terminal device transmits msg1, the counter continues to record the number of transmissions of msg1, so as to avoid excessive delay of random access caused by that the number of transmissions of msg1 exceeds the maximum number of transmissions of msgA and msg1.

The terminal device can also reset the counter to the initial value before transmitting msg1 and then record the number of transmissions of msg1 using the counter, so as to improve the success rate of the random access procedure.

Since the terminal device records the number of transmissions of two types of random access messages by using one counter, compared with the scheme of using two counters respectively corresponding to two types of random access messages, the number of counters maintained by the terminal device is reduced, thereby reducing the complexity of the fallback scheme.

After falling back to the 4-steps random access procedure, when sending msg1 for the first time, the terminal device can further increase a transmit power on the basis of a transmit power used for the last transmission of a preamble in msgA, can also use the transmission power used for the last transmission of the preamble in msgA to transmit msg1, and can also use an initial transmission power for the preamble to transmit msg1.

For example, the transmit power used for the last (Nth) transmission of the preamble in msgA is $P_N$, and $P_N$ is less than a maximum transmit power $P_{MAX}$ of the terminal device, then the terminal device can set $P_N+P_S$ as a transmit power used for first transmission of msg1. $P_S$ is a step length of power increase, and $P_S$ is a positive number.

For another example, the transmit power used for the last (Nth) transmission of the preamble in msgA is $P_N$. If $P_N$ is equal to the maximum transmit power $P_{MAX}$ of the terminal device, or if $P_N+P_S$ is greater than $P_{MAX}$, the terminal device can set $P_N$ as the transmit power used for the first transmission of msg1. $P_S$ is the step length of power increase, and $P_S$ is a positive number.

For another example, the terminal device can set the initial transmit power i.e., PREAMBLE_RECEIVED_TARGET_POWER+DELTA_PREAMBLE, as the transmit power for the first transmission of msg1, where PREAMBLE_RECEIVED_TARGET_POWER and DELTA_PREAMBLE are power values, and DELTA_PREAMBLE is related to a length of the preamble in msg1.

After the terminal device transmits msg1, the terminal device can perform the 4-steps random access procedure according to the method illustrated in FIG. 2. In response to successful random access, the terminal device can set the counter to the initial value.

In some implementations, the method 600 further includes the following.

When the random access procedure to which the second-type random access message belongs fails, and the number of transmissions recorded by the counter is greater than or equal to K, report a random access problem to a higher layer, where K is a maximum number of transmissions of the first-type random access message and the second-type random access message, and K is a positive integer.

When one of the following cases occurs, the terminal device can determine that the 4-steps random access procedure fails.

The terminal device does not receive a correct RAR before an RAR window expires.

The terminal device does not receive a correct contention resolution message before the contention resolution timer expires.

The above two cases are only two examples of failure of the random access procedure, and the terminal device can determine that the random access procedure to which the second-type random access message belongs fails according to other cases.

After the 4-steps random access procedure fails, if the number of transmissions recorded by the counter is less than K, the terminal device can retransmit msg1, and meanwhile, the number of transmissions recorded by the counter is increased by 1, and if the number of transmissions recorded by the counter is greater than or equal to K, the terminal device can stop the random access procedure and report the random access problem to the higher layer. For example, a corresponding cause value can be selected and reported to the higher layer according to a specific cause of the random access failure, so that the higher layer can take corresponding measures.

It can be noted that the present disclosure is not limited to the fallback from the 2-steps random access procedure to the 4-steps random access procedure, but can be applied to switch between different types of random access procedures. The above implementations are only for illustration, and are not intended to limit the present disclosure.

The examples of the method of random access provided in the present disclosure is illustrated in detail above. It can be understood that, in order to implement the above-mentioned functions, a device of random access includes hardware structures and/or software modules for executing each function. Those skilled in the art can easily realize that in combination with units and algorithm steps of the examples described in the implementations disclosed herein, the present disclosure can be implemented in the form of hardware or a combination of hardware and computer software. Whether a certain function is executed by hardware or a manner of computer software driving hardware depends on the specific application and design constraint conditions of the technical solution. Professionals and technicians can use different methods for each specific application to implement the described functions, but such implementation cannot be considered beyond the scope of the present disclosure.

In the present disclosure, the device of random access can be divided into functional units according to the foregoing method examples. For example, each function may correspond to one functional unit, or two or more functions may be integrated into one processing unit. The above-mentioned integrated unit can be implemented in the form of hardware or software functional unit. It can be noted that the division of units in the present disclosure is illustrative, and is only a logical function division, and there may be other division manners in actual implementation.

Figure 7:
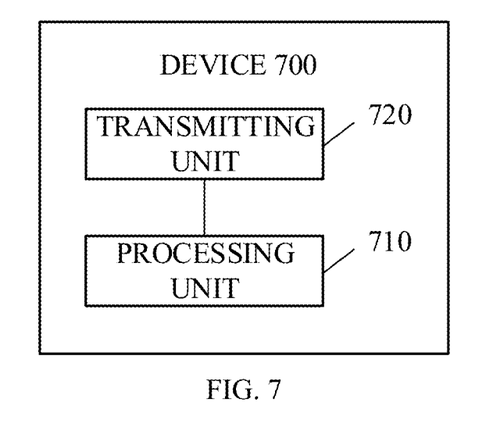
FIG. 7 is a schematic diagram illustrating a device of random access provided in the present disclosure.

FIG. 7 is a schematic structural diagram illustrating a device of random access provided in the present disclosure. The device 700 includes a processing unit 710 and a transmitting unit 720. The transmitting unit 720 can be controlled by the processing unit 710 to perform transmitting.

The transmitting unit 720 is configured to transmit a first-type random access message, where the first-type random access message contains a preamble and a payload. The transmitting unit 720 is configured to transmit a second-type random access message when a random access procedure to which the first-type random access message belongs fails and the number of transmissions recorded by a counter reaches N, where the counter is configured to record the number of transmissions of the first-type random access message and the second-type random access message, and N is a positive integer.

In some implementations, the processing unit 710 is further configured to report a random access problem to a higher layer when a random access procedure to which the second-type random access message belongs fails and the number of transmissions recorded by the counter is greater than or equal to K, where K is the maximum number of transmissions of the first-type random access message and the second-type random access message, and K is a positive integer.

In some implementations, a transmit power for a preamble in the second-type random access message is greater than or equal to a transmit power used for Nth transmission of the preamble in the first-type random access message.

In some implementations, a transmit power for the preamble in the second-type random access message is equal to an initial transmit power for the preamble in the first-type random access message.

In some implementations, the processing unit 710 is further configured to determine the initial transmit power according to a length of the preamble.

In some implementations, the processing unit 710 is further configured to set the counter to an initial value before transmitting the second-type random access message.

In some implementations, the processing unit 710 is further configured to set the counter to the initial value in response to successful random access.

Figure 8:
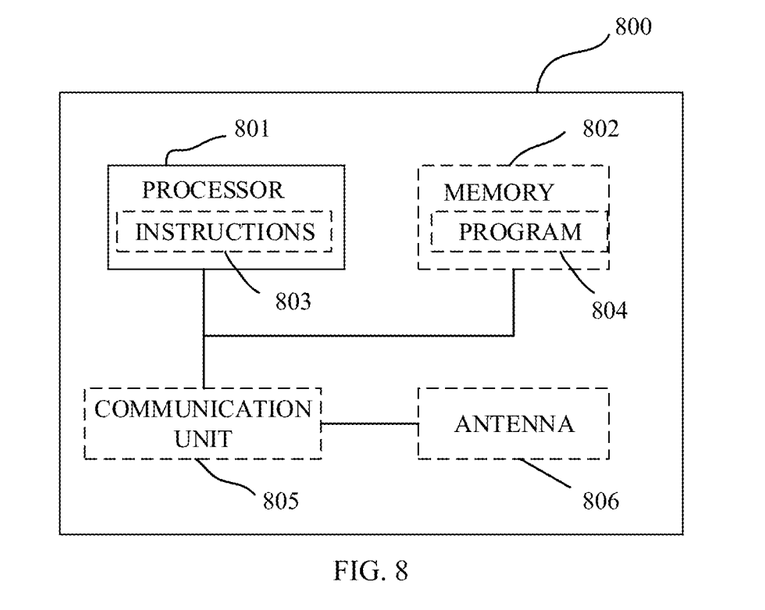
FIG. 8 is a schematic diagram illustrating a terminal device provided in the present disclosure.

FIG. 8 is a schematic structural diagram illustrating a terminal device provided in the present disclosure. A unit or module indicated via dotted lines in FIG. 8 indicates that the unit or the module is optional. The device 800 can implement the methods described in the foregoing method implementations. The device 800 may be a terminal device or a chip.

The device 800 includes one or more processors 801, and the one or more processors 801 can support the device 800 to implement the methods in the method implementations corresponding to FIGS. 2 to 6. The processor 801 may be a general-purpose processor or a special-purpose processor. For example, the processor 801 may be a central processing unit (CPU). The CPU can be configured to control the device 800, execute software programs, and process data of the software programs. The device 800 can also include a communication unit 805 to implement signal input (reception) and output (transmission).

For example, the device 800 may be a chip, and the communication unit 805 may be an input and/or output circuit of the chip, or the communication unit 805 may be a communication interface of the chip, and the chip may be a part of a terminal device, a network device, or other wireless communication devices.

For another example, the device 800 may be a terminal device, and the communication unit 805 may be a transceiver of the terminal device, or the communication unit 805 may be a transceiver circuit of the terminal device.

The device 800 may include one or more memories 802 storing a program 804, and the program 804 can be run by the processor 801 to generate instructions 803, so that the processor 801 executes the methods in the foregoing method implementations according to the instructions 803. The memory 802 can also store data. The processor 801 can also read data stored in the memory 802. The data can be stored at the same storage address as the program 804, or the data can be stored at a different storage address from the program 804.

The processor 801 and the memory 802 can be provided separately or integrated together, for example, integrated on a system on chip (SOC) of the terminal device.

The device 800 may also include an antenna 806. The communication unit 805 is configured to implement a transceiver function of the device 800 via the antenna 806.

For the specific manner in which the processor 801 performs the method of random access, reference may be made to the related illustration in the method implementations.

It can be understood that each step of the foregoing method implementations may be completed by a logic circuit in the form of hardware or instructions in the form of software in the processor 801. The processor 801 may be a CPU, a digital signal processor (DSP), an application specific integrated circuit (ASIC), a field programmable gate array (FPGA) or other programmable logic devices, for example, discrete gates, transistor logic devices, or discrete hardware components.

The present disclosure further provides a computer program product, and the computer program product is executed by the processor 801 to implement the method in any of the method implementations in the present disclosure.

The computer program product may be stored in the memory 802, for example, a program 804, and the program 804 is finally converted into an executable object file that can be executed by the processor 801 through processing such as preprocessing, compilation, assembly, and linking.

The present disclosure further provides a computer-readable storage medium storing a computer program, and the computer program is executed by a computer to implement the method in any of the method implementations in the present disclosure. The computer program may be a high-level language program or an executable target program.

The computer-readable storage medium is, for example, the memory 802. The memory 802 may be a volatile memory or a non-volatile memory, or the memory 802 may include both a volatile memory and a non-volatile memory. The non-volatile memory can be a read-only memory (ROM), a programmable read-only memory (PROM), an erasable programmable read-only memory (EPROM), an erase programmable read-only memory (EEPROM), or a flash memory. The volatile memory may be a random access memory (RAM), which is used as an external cache. By way of exemplary but not restrictive illustration, many forms of RAM are available, such as a static random access memory (SRAM), a dynamic random access memory (DRAM), a synchronous dynamic random access memory (SDRAM), a double data rate SDRAM (DDR SDRAM), an enhanced synchronous dynamic random access memory (ESDRAM), a synchronous link dynamic random access memory (SLDRAM), and a direct rambus RAM (DR RAM).

Those skilled in the art can clearly understand that, for the convenience and conciseness of illustration, the specific working process of the device and equipment described above and technical effects generated by the device and equipment described above, reference can be made to the corresponding process and technical effects in the foregoing method implementations, which will not be repeated herein.

In the several implementations provided in the present disclosure, the disclosed systems, devices, and methods can be implemented in other manners. For example, some features of the method implementations described above may be ignored or not implemented. The device implementations described above are merely illustrative. The division of units is only a logical function division. In actual implementation, there may be other division manners, and multiple units or components may be combined or integrated into another system. In addition, the coupling between the various units or the coupling between the various components may be direct coupling or indirect coupling, and the foregoing coupling includes electrical, mechanical, or other forms of connection.

It can be understood that, in the various implementations of the present disclosure, the sequence number of each process does not mean the execution order. The execution order of each process can be determined by a function and internal logic of each process, and does not constitute any limitation on the implementation process of implementations of the present disclosure.

In addition, the terms "system" and "network" in this article are often used interchangeably in this article. The term "and/or" in this article is only an association relationship that describes associated objects, which means that there can be three relationships, for example, A and/or B, which can mean: A alone exists, A and B exist at the same time, and B alone exists. In addition, the character "/" in this article generally indicates that the associated objects before and after "/" are in an "or" relationship.

In short, the above descriptions are only preferred implementations of the technical solutions of the present disclosure, and are not used to limit the scope of protection of the present disclosure. Any modification, equivalent replacement, improvement, etc. made within the spirit and principle of the present disclosure shall fall in the scope of protection of the present disclosure.

What is claimed is:

1. A method of random access, comprising:
    in response to a terminal device failing to achieve access when a value of a counter for recording a number of transmissions of a random access message containing a preamble reaches N during a first random access procedure,
    switching, by the terminal device, from the first random access procedure to a second random access procedure, the counter being further configured to count a number of transmissions of a random access message containing a preamble during the second random access procedure, and N being a positive integer;
    wherein the value of the counter is N+1 after the terminal device transmits the random access message containing the preamble for a first time during the second random access procedure;
    wherein the method further comprises:
        during a process of counting the number of transmissions of the random access message containing the preamble during the second random access procedure,
        determining, by the terminal device, that the second random access procedure fails and reporting, by the terminal device, a random access problem to a higher layer, in response to the number of transmissions recorded by the counter being greater than or equal to K, and K being a positive integer;
    wherein a transmit power for first transmission of the preamble during the second random access procedure is greater than a transmit power for Nth transmission of the preamble during the first random access procedure.

2. The method of claim 1, further comprising:
    determining the initial transmit power according to a length of the preamble.

3. The method of claim 1, further comprising:
    setting the counter to an initial value in response to successful random access.

4. The method of claim 1, wherein the first random access procedure is 2-steps random access procedure, and the second random access procedure is a 4-steps random access procedure.

5. A terminal device, comprising:
    a processor; and
    a memory storing a computer program which, when executed by the processor, causes the processor to:
    switch from a first random access procedure to a second random access procedure, in response to the terminal device failing to achieve access when a value of a counter for recording a number of transmissions of a random access message containing a preamble reaches N during the first random access procedure, the counter being further configured to count a number of transmissions of a random access message containing a preamble during the second random access procedure, and N being a positive integer;

wherein the value of the counter is N+1 after the terminal device transmits the random access message containing the preamble for a first time during the second random access procedure;

wherein the computer program which, when executed by the processor, further causes the processor to:

during a process of counting the number of transmissions of the random access message containing the preamble during the second random access procedure, determine that the second random access procedure fails and report a random access problem to a higher layer, in response to the number of transmissions recorded by the counter being greater than or equal to K, and K being a positive integer;

wherein a transmit power for first transmission of the preamble during the second random access procedure is greater than a transmit power for Nth transmission of the preamble during the first random access procedure.

6. The terminal device of claim 5, wherein the computer program which, when executed by the processor, further causes the processor to determine the initial transmit power according to a length of the preamble.

7. The terminal device of claim 5, wherein the computer program which, when executed by the processor, further causes the processor to set the counter to an initial value in response to successful random access.

8. The terminal device of claim 5, wherein the first random access procedure is 2-steps random access procedure, and the second random access procedure is a 4-steps random access procedure.

9. A non-transitory computer-readable storage medium storing a computer program which, when executed by a processor, causing the processor to:

switch from a first random access procedure to a second random access procedure, in response to a terminal device failing to achieve access when a value of a counter for recording a number of transmissions of a random access message containing a preamble reaches N during the first random access procedure, the counter being further configured to count a number of transmissions of a random access message containing a preamble during the second random access procedure, and N being a positive integer;

wherein the value of the counter is N+1 after the terminal device transmits the random access message containing the preamble for a first time during the second random access procedure;

wherein the computer program which, when executed by the processor, further causes the processor to:

during a process of counting the number of transmissions of the random access message containing the preamble during the second random access procedure, determine that the second random access procedure fails and report a random access problem to a higher layer, in response to the number of transmissions recorded by the counter being greater than or equal to K, and K being a positive integer;

wherein a transmit power for first transmission of the preamble during the second random access procedure is greater than a transmit power for Nth transmission of the preamble during the first random access procedure.

10. The non-transitory computer-readable storage medium of claim 9, wherein the computer program is further executed by the processor to cause the processor to:

determine the initial transmit power according to a length of the preamble.

11. The non-transitory computer-readable storage medium of claim 10, wherein the computer program is further executed by the processor to cause the processor to:

set the counter to an initial value in response to successful random access.

12. The non-transitory computer-readable storage medium of claim 10, wherein the first random access procedure is 2-steps random access procedure, and the second random access procedure is a 4-steps random access procedure.

* * * * *